Feb. 2, 1965     L. E. SODERQUIST     3,167,810

TIRE CARCASS LOADING APPARATUS FOR TIRE CURING PRESS

Filed May 17, 1961     9 Sheets-Sheet 1

INVENTOR.
LESLIE E. SODERQUIST
BY Ely, Fry & Hamilton
ATTORNEYS

INVENTOR.
LESLIE E. SODERQUIST
BY *Oly, Frye & Hamilton*

ATTORNEYS

Feb. 2, 1965 L. E. SODERQUIST 3,167,810
TIRE CARCASS LOADING APPARATUS FOR TIRE CURING PRESS
Filed May 17, 1961 9 Sheets-Sheet 7

INVENTOR.
LESLIE E. SODERQUIST
BY Ely, Frye & Hamilton
ATTORNEYS

United States Patent Office 3,167,810
Patented Feb. 2, 1965

3,167,810
TIRE CARCASS LOADING APPARATUS FOR TIRE CURING PRESS
Leslie Edward Soderquist, Silver Lake, Ohio, assignor to The McNeil Machine & Engineering Company, Akron, Ohio, a corporation of Ohio
Filed May 17, 1961, Ser. No. 110,683
6 Claims. (Cl. 18—2)

The present invention relates to improvements in tire presses for shaping and curing unvulcanized tire bands with separable mold sections. More particularly, the invention relates to improved mechanisms for automatically loading uncured tire bands in operative position with respect to the press when open, that is, in registry with a mold section. Specifically, the invention relates to improvements particularly intended for use in the locating and positioning of uncured tire bands uniformly and concentrically over a forming mechanism and on the bead seat of a mold section.

The press loading mechanisms of the invention are particularly intended to improve the operation of presses having a permanent diaphragm or "bag" type forming mechanism for finally shaping the uncured tire bands before completion of the curing. The loading mechanisms are also particularly intended for the positive positioning of relatively large heavy uncured bands intended to form truck tires.

Figure 4:
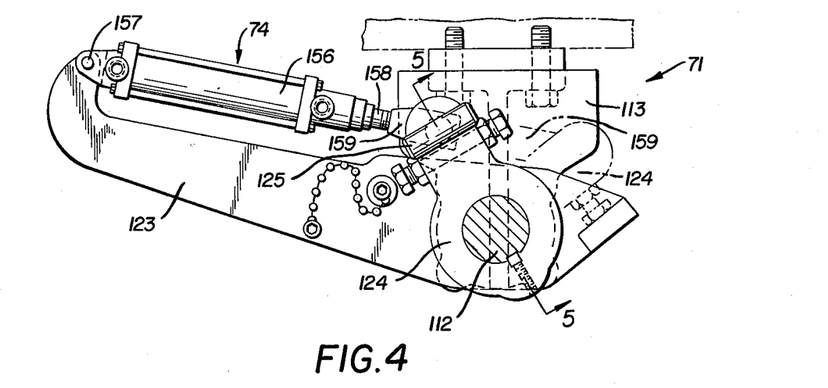
FIG. 4 is an enlarged detail section, taken substantially as indicated on line 4—4 of FIG. 1, showing the power means and linkage for selectively rotating the vertical support of the loading mechanism.

In the manufacture of tires such as used for automobiles, the uncured tire band is built substantially flat, with the beads set in from the main surface only a relatively short distance. Hence, the elongated or extended height of the forming mechanism diaphragm in the loading position is substantially the same as the overall height (or width) of any typical tire band to be cured. (For further explanation, reference is made to FIG. 4 of applicant's prior U.S. Patent No. 2,808,618.)

However, in the building of large truck tires and similar tires requiring great carcass strength, many plies are used and it is common practice to employ deep bead seats on the tire building drum. The diameter of the beads may be several inches less than the diameter of the main surface. Hence, the elongated or extended height of the diaphragm in the loading position is substantially greater than the overall height of the tire band, and the upper end of the diaphragm will project a substantial distance above the uncured tire band when it is loaded in the press.

If the press were to be closed directly upon the diaphragm in the loading position, the projecting portion of the diaphragm would tend to buckle or fold outwardly over the upper edge of the tire band, pinching the diaphragm between the upper mold section and the tire band. Or, the radial expansion of a projecting diaphragm might cause the band to rub against or frictionally engage the inside surface of the upper bead of the tire band. In either event, the disadvantages are manifest.

Another problem solved by the loading mechanism of the invetinon is concerned with the weight of the uncured tire band and placement thereof uniformly and concentrically over the diaphragm and on the bead seat of the lower mold. A large heavy truck tire should be positively located on the bead seat in such a manner that uniform and concentric seating is assured. Otherwise, the loading operation would be improper, delay in the press operating cycle could occur, and damage to the press per se, or the tire band might result.

It is, therefore, an object of the present invention to improve the loading operations of locating and positioning uncured tire bands in an operative position with respect to an open press.

It is a further object to provide improved mechanism for the locating and the positive positioning of relatively large uncured bands having deep beads, such as truck tires, without damage or injury to the uncured tire band, the shaping mechanism or the press per se.

Still further, it is an object to provide a concept of automatic loading which will improve the efficiency of presses used for the production of relatively large tires.

These and other objects of the invention, as well as the advantages thereof, will be apparent in view of the following detailed description and the attached drawings.

General description

Figure 2:
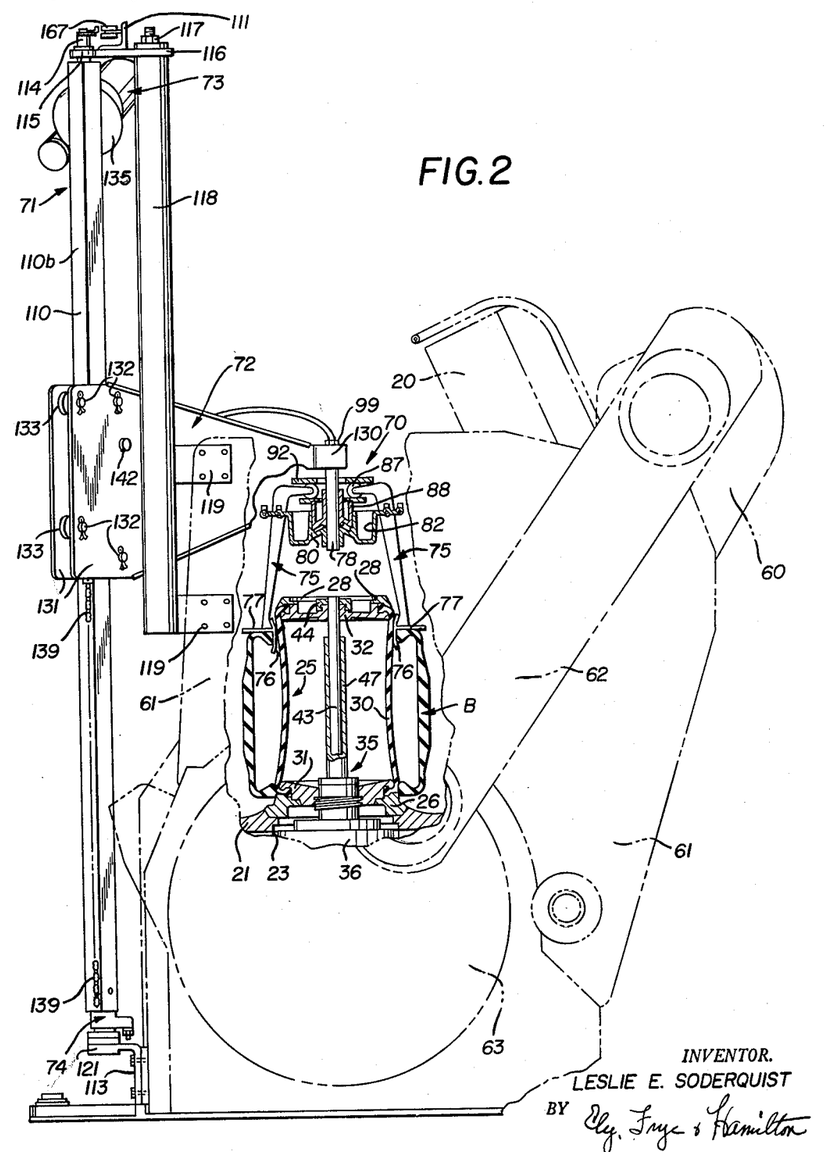
FIG. 2 is a schematic side elevation, partly in section, showing the loading mechanism after locating and positively positioning an uncured tire band over a forming mechanism and on the bead seat of a mold section.

A tire curing press suitable for practice of the invention, as best shown in FIG. 2, has separable upper and lower mold sections, 20 and 21, and axially centered forming mechanisms or diaphragm-type shaping means. Presses of this type are well known to this art as shown in a number of prior art patents of the inventor, including United States Patent No. 2,808,618 to which reference is made for such details as are required to more fully understand the invention. These presses are constructed so that it is possible to obtain a maximum "tilt-back" of the upper mold section and clearance above the lower mold section without loss of valuable head room above the press. This type of press is preferred, but it will be apparent that presses of other types and designs could be used in the practice of the invention, for example, presses in which the upper mold section is not moved entirely out of the way and to one side of the press, so long as there is at least limited clearance above the lower mold section or so long as an uncured band can be registered with the lower mold section when the press is open.

Figures 16, 17:
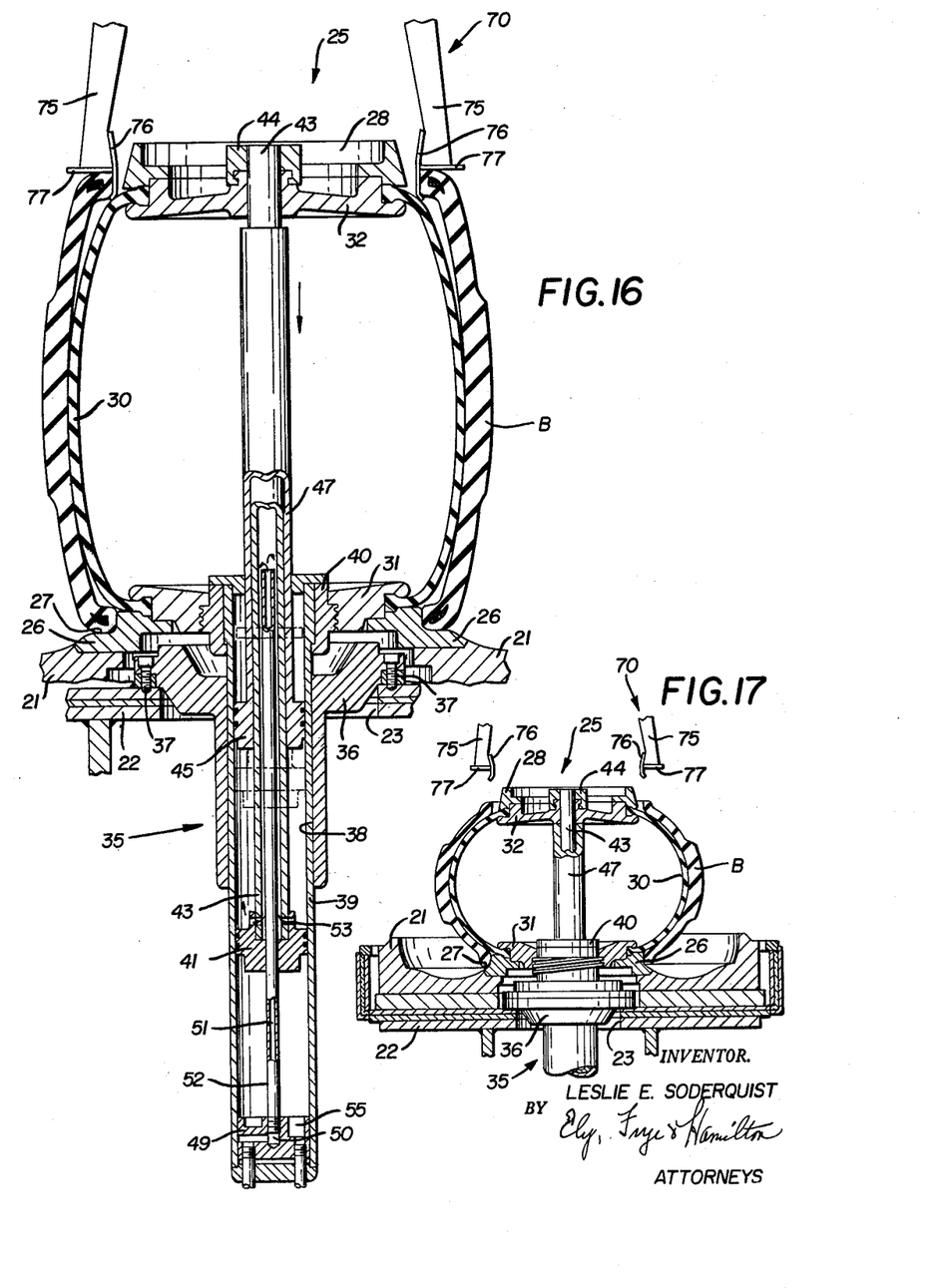
FIG. 16 is a sectional view showing a tire band as located and positioned in the press.
FIG. 17 is a similar view showing withdrawal of the loading mechanism.

As best shown in FIGS. 2, 16 and 17, each lower mold section 21 is carried on a press bed plate or base 22. The base 22 has a central bore 23 through which extends the operating cylinder for a diaphragm-type shaping means or forming mechanism indicated generally by the numeral 25.

The shaping mechanism 25 includes a movable annular lower bead ring 26 providing a circular seat for the lower beaded edge of an uncured tire band (B). The molding surfaces of the ring 26 and of the lower mold section 21 define the lower portion of a cured tire (T). The upper portion of a tire T is defined by the molding surface of a movable annular bead ring 28 and the upper mold section 20. The bag 30 of the shaping mechanism is an elongated, deformable, heavy walled, preferably rubber, cylinder, clamped at the lower end between a plate ring 31 and bead ring 26 and at the upper end between another plate ring 32 and bead ring 28.

The upper bead ring 28-plate ring 32 assembly is moved relatively to the lower bead ring 26-plate ring 31 assembly, to selectively permit the bag 30 to radially expand during the shaping operation sequence and to be elongated or extended to cylindrical form after the curing operation (as described in further detail below) by a cylinder mechanism 35. As best shown in FIG. 16, a bell-shaped housing 36 is fitted in the central bore 23 of the press bed plate and secured by bolts 37. The housing 36 is hollow and has a downwardly extending stem defining a bore 38 for slidably receiving a cylinder casing 39. The upper end of casing 39 carries an exteriorly threaded cap member 40 for attachment of the plate ring 31.

Within the cylinder casing 39 are two pistons. The lower piston 41 carries a hollow piston rod 43 which extends axially through the cap member 40 and carries the upper plate ring 32. The upper bead ring 28 may be secured to the plate ring 32 by a coupling member 44 clamped on the upper end of piston rod 43. The upper piston 45 is seated on the exterior of piston rod 43 so as to be capable of independent movement. Attached to the upper side of piston 45 is an elongated stacking or positioning sleeve 47 which provides a positive means to maintain the upper bead ring 28-plate ring 32 assembly in a predetermined position during the loading and shaping operation sequences (as described in further detail below).

At the lower end of cylinder casing 39 is a head cap 49 having a pair of inlet bores. An axial inlet bore 50 communicates with the hollow bore 51 of a rod 52 slidably fitted through the lower piston 41 and extending upwardly within the hollow piston rod 43. Above piston 41 and below piston 45, radial passages 53 extend through the wall of piston rod 43. The second inlet bore 55 in the head cap 49 communicates with the interior of the cylinder casing 39 below the lower piston 41.

To raise the stacking sleeve 47 and the upper bead ring 28-plate ring 32 assembly to maximum elevation above the lower mold section 21 (the condition of FIG. 2), fluid under pressure may be admitted through inlet 55. The lower piston 41 raises, carrying the upper piston 45, until the cap member 40 is contacted. Thus, the stacking sleeve 47 will be at approximately the height of the upper bead of the band B and the bag 30 will be elongated.

As the bag 30 is radially expanded during the shaping operation sequence, the upper bead ring 28-plate ring 32 assembly is lowered while maintaining the elevation of the stacking sleeve 47 (the approximate condition of FIG. 16). This is accomplished by fluid admitted through inlet bore 50 which forces the lower piston 41 downward a predetermined distance, maintaining the upper piston 45 in contact with the cap member 40.

When the upper bead ring 28-plate ring assembly 32 is in the position of FIG. 17, the pressure between the upper piston 45 and the lower piston 41 is equalized and the downward movement stops. At this point (as described in further detail below), the bag 30 is fully within the partially shaped band B.

To strip the tire T from the lower mold section 21 after curing, both bead ring-plate ring assemblies are raised together, in a conventional manner, by an actuating means (not shown) connected to the lower end of the cylinder casing 39 which is raised upwardly within the bore 38 of the bell-shaped housing 36. Thereafter, the bag 30 is elongated as described above and a cured tire T is discharged from the press in a conventional manner (also not shown).

The movable upper mold sections 20 are supported from a crosshead 60. On opposite sides of the lower mold sections 21 are guide plates 61 extending upwardly from the base 22. At each end of the crosshead 60 are suitable guiding arms (not shown) having roller means engaged in parallel front and rear vertical guideways (also not shown) in the guide plates 61. The crosshead 60 is pivoted to the upper end of a pair of operating links 62 on opposite sides of the press and outside of the guide plates 61. The links 62 are actuated by large motor driven bull gears 63 to raise the crosshead and open the press for loading of an uncured tire band.

The loading mechanism has been conceived primarily for loading and positioning of a green, unvulcanized or uncured tire band B into a dual-type press. However, in many aspects of the invention the improvements may be adapted to a single type press. A loading mechanism for the positive positioning of a band B uniformly and concentrically over the bag 30 of the shaping mechanism 25 and onto the seat of a lower mold section 21 includes the band holder, indicated generally at 70, the vertically extending and rotatable support, indicated generally at 71, and a non-extensible jib arm, indicated generally at 72, carrying each band holder 70 and extending radially of each support 71 and movable longitudinally thereon during the loading operation sequence. A power means, indicated generally at 73, drives the jib arm 72 longitudinally of the support 71. Another power means, indicated generally at 74, rotates the support 71.

*The band holders*

A band holder 70 has a plurality of, at least two and preferably four, six or eight, downwardly directed operating arms 75. Each operating arm 75 preferably comprises two spaced apart, identical, fabricated steel plates generally in the shape of an inverted L. At the lower end of each arm 75 is a transversely curved segment or shoe 76, adapted to contact the inner surface of a beaded edge of a tire band B, and a lateral outwardly extending pusher plate 77, adapted to contact the upper or side surface of a beaded edge of a tire band B. The holder shoes 76 contact the tire band B at spaced apart areas and, when radially expanded or moved outwardly, have a diameter greater than the maximum diameter of bag 30 when elongated.

The operating arms 75 are actuated through a connecting linkage responsive to relative movement of a piston and cylinder mechanism supported by a hollow stationary shaft 78 depending from the outer end of jib arm 72. Fastened coaxially on shaft 78, as by a ring collar 79, is an upwardly facing pot cylinder 80. The cylinder 80 has a large diameter bore 81, an annular well 82 surrounding the walls defining bore 81, and a series of radially extending operating arm hanger brackets 83.

Each hanger 83 has one or more transverse bosses 84 receiving and rotatably mounting a pivot pin 85 for each operating arm 75. As shown, the effective diameter of the arms of band holder 70 are adjusted for engaging a smaller diameter tire bead, each pin 85 being inserted through a radially inward boss 84a. For a larger diameter tire bead, the pins 85 may be inserted through each radially outward boss 84b. To move the operating arms 75 on the pivot point defined by the pins 85, the inner ends of each arm 75 are provided with suitable actuating means such as the pin 86 rotatably mounting an actuation roller 87.

Figures 12, 13:
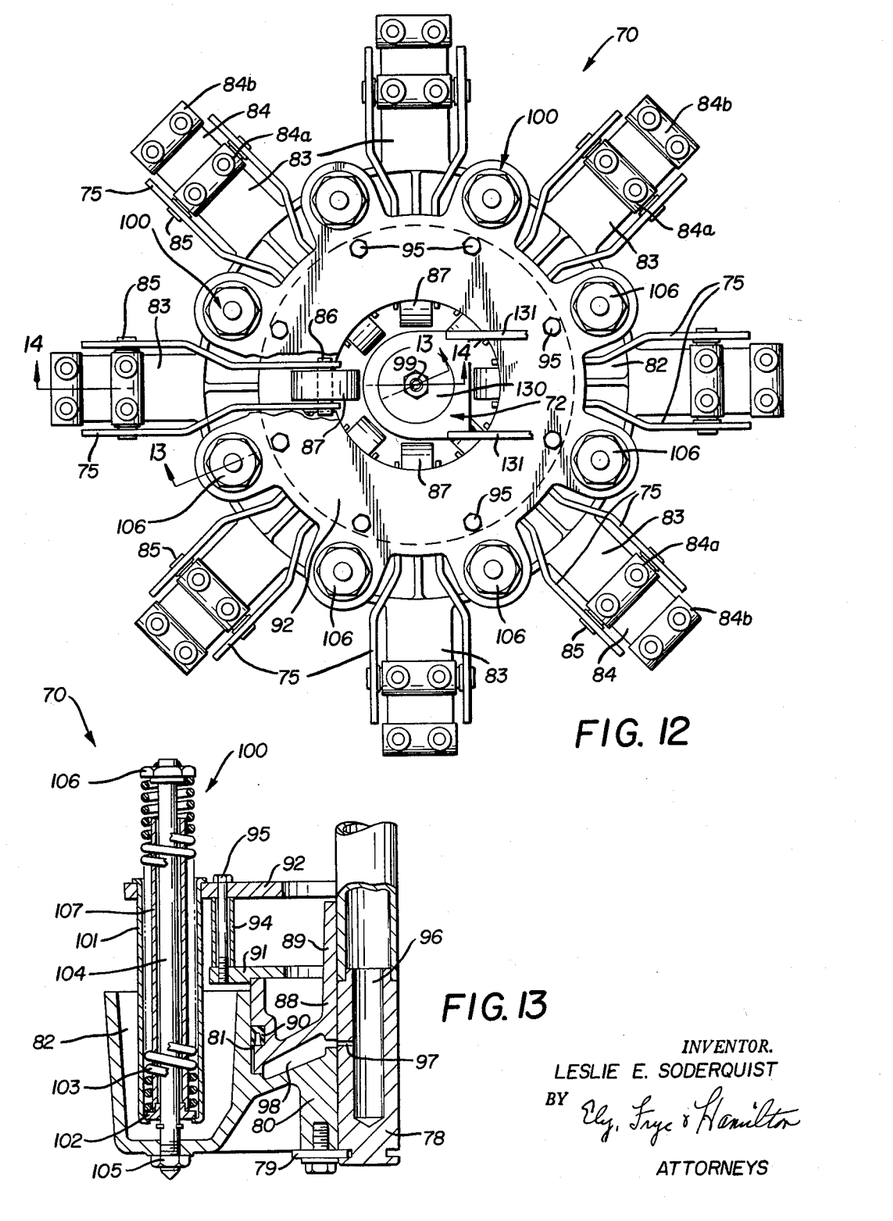
FIG. 12 is a top view of a holder for an uncured tire band.
FIG. 13 is a partial section taken substantially as indicated on line 13—13 of FIG. 12.
Figure 14:
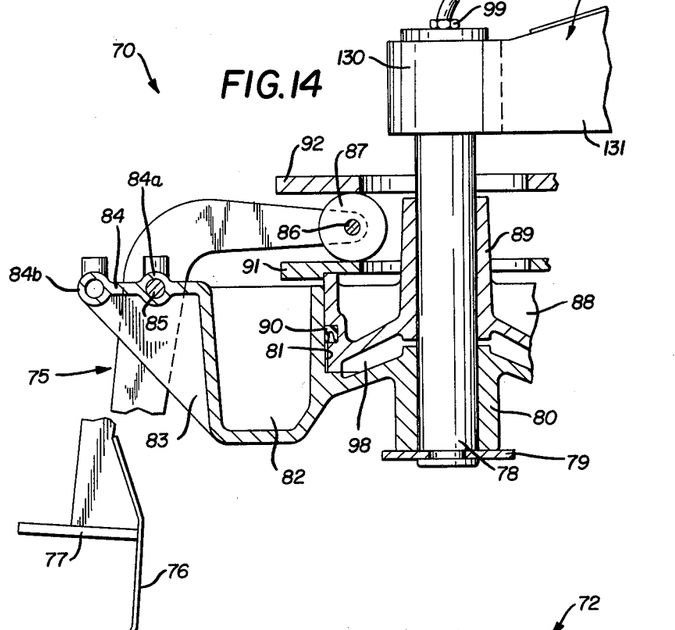
FIG. 14 is a partial section taken substantially as indicated on line 14—14 of FIG. 12, showing the band holder in a "fail-safe" or active position.
Figure 15:
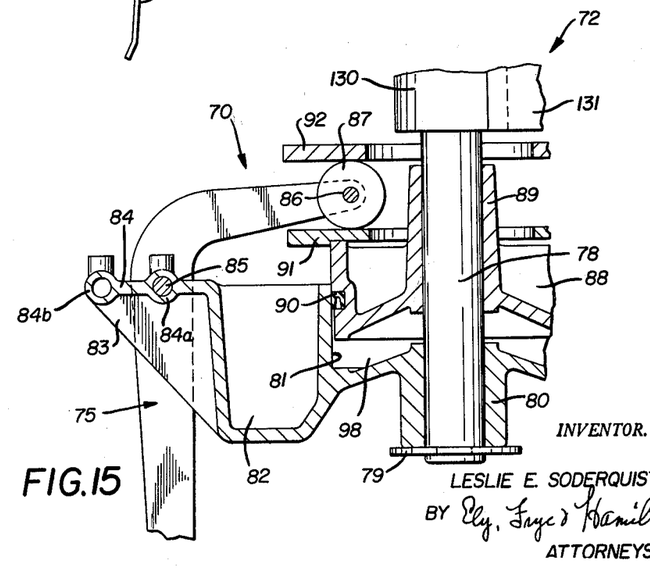
FIG. 15 is similar to FIG. 14 but showing the band holder in an inactive position.

Slidably fitted within the axial bore 81 of cylinder 80 is sturdy piston 88. The piston 88 has a hub portion 89 surrounding or extending coaxially around the shaft 78 and a U-shaped peripheral or circumferential fluid pressure seal 90. The upper face of piston 88 carries a circular plate 91 extending radially outward and beneath the actuation rollers 87. Above the rollers 87 is another circular plate 92. As best shown in FIG. 13, the plates 91 and 92 are maintained in a predetermined parallel relation to movably or slidably confine the actuating means 87 by spacers 94 and bolts 95.

The hollow bore 96 of shaft 78 communicates through a small diameter orifice 97 (see FIG. 13) with an annular manifold or pressure chamber 98 specially between the cylinder 80 and piston 88. Fluid pressure, supplied from a top fitting 99 on jib arm 72, will pass through bore 96 and orifice 97 into manifold 98, raising the piston 88 away from the base of cylinder 80, preferably until the hub portion 89 contacts and "stops" against the under side of jib arm 72. Such raising of the piston 88 will cause the actuation rollers 87, confined between plates 91 and 92, to move radially outwardly so that the lower ends of the operating arms 75, rotating about pins 85, will move inwardly to the collapsed or smallest diameter position.

In the absence of fluid pressure in manifold 98, the operating arms are biased outwardly to the expanded or largest diameter position by a series of expansive or tension means 100 attached to the annular well 82 of the cylinder 80 and reacting against the upper plate 92 of piston 88 to move the piston down and toward the base of cylinder 80. Referring to FIG. 13, each tension means 100 may include a confining sleeve 101 hanging from a suitable bore in the upper plate 92. Fitted within the lower end of sleeve 101 is a plug 102 seating the lower end of a strong coiled spring 103. Extending coaxially of spring 103 is a long bolt 104. The lower end of bolt 104 is attached as at 105 to the bottom of the annular well 82. The upper end of bolt 104 carries a specially adapted nut 106 seating the upper end of spring 103. To prevent galling of the bolt 104 by contact with spring 103, a protective bushing 107 may be placed around bolt 104 as shown.

As described, the band holder 70 is so conceived as to be "fail-safe." That is, a tire band B engaged by the shoes 76 of the operating arms can be released or disengaged only if the normal bias of means 100 is overcome by fluid pressure in manifold 98. This feature is preferred so that accidental failure of pressure fluid supply will not permit the heavy tire band B to unintentionally drop on the operator, the floor, or the press. However, in the broad sense, practice of the invention should not be limited by this specific feature.

The supports

A support 71 preferably includes two vertical columns 110, preferably rectangular or square in cross section and located permanently one at each front corner of a press and interconnected at their upper ends by a cross beam 111. Each column 110 is precisely fabricated or machined to provide opposite facing surfaces 110a and 110b extending exactly parallel to the axis of a lower mold section 21. The lower end of each column 110 has a reduced diameter stud 112 rotatably journaled in a shelf bracket 113 attached to the front of the press base. The upper end of each column 110 also has a similar stud 114 rotatably journaled in a plate bracket 115.

Figures 7, 8:
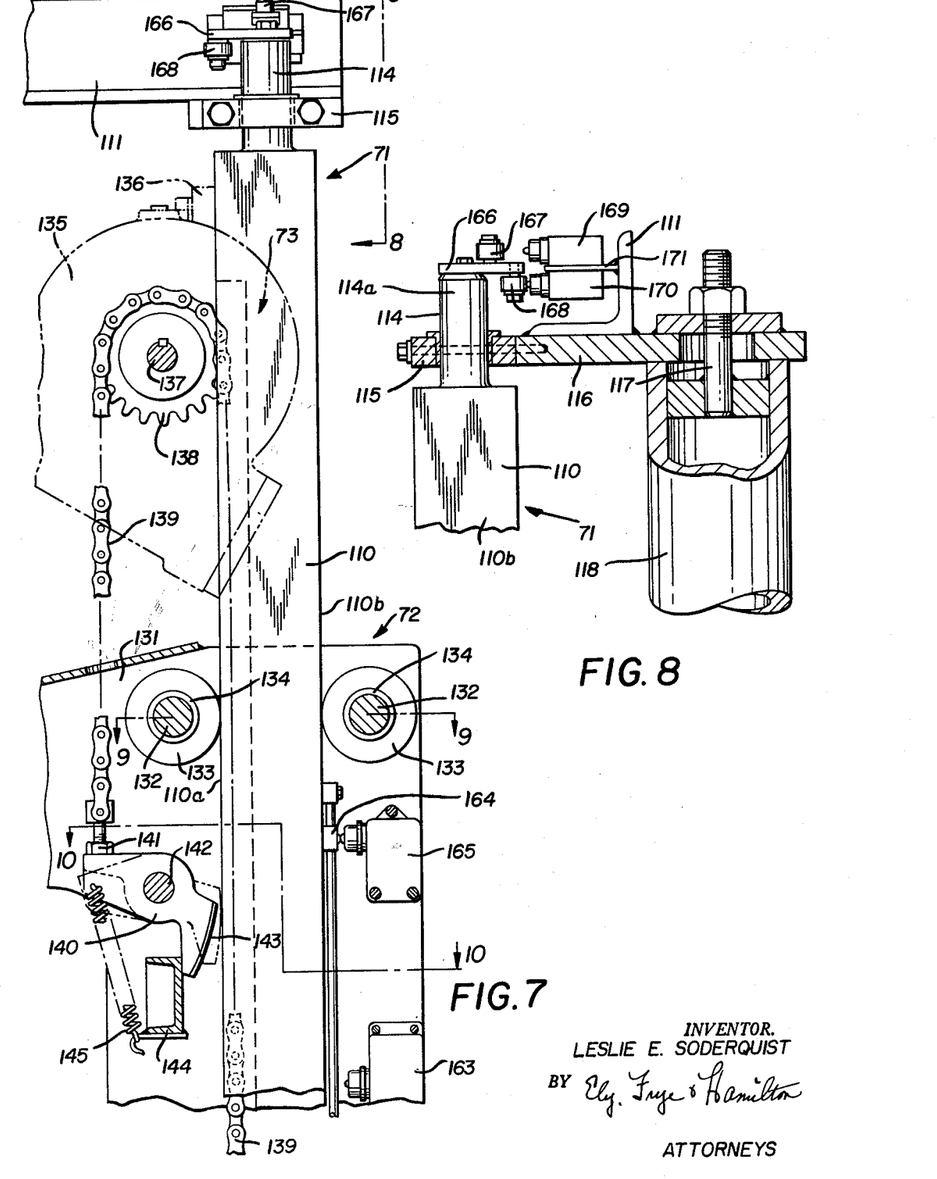
FIG. 7 is a side view showing further details of the jib arm drive mechanism.
FIG. 8 is a detail view taken substantially as indicated on line 8—8 of FIG. 7.

As best shown in FIG. 8, each bracket 115 is secured to a short web plate 116 attached to and extending transversely of the ends of the cross beam 111. Rearwardly of the rotatable stud 114, each web plate 116 is adapted, as at 117, for attachment of the upper end of a support member 118. As best shown in FIG. 2, the members 118 strengthen and stabilize the support columns 110 and may be attached, as by plates 119, to the forward edge of the respective guide plates 61.

Figure 5:
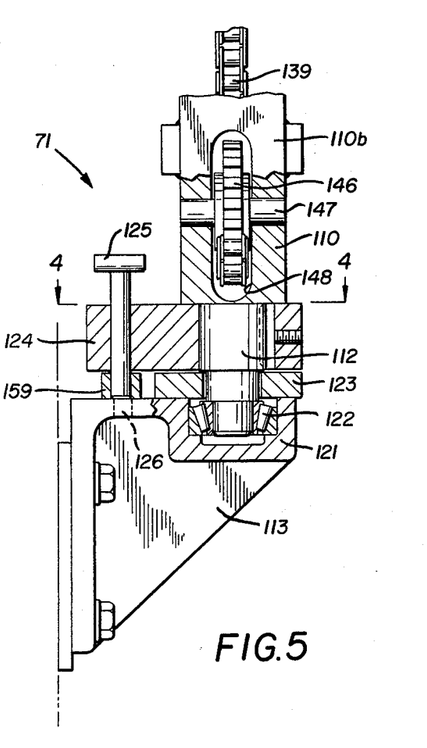
FIG. 5 is another detail section, taken substantially as indicated on line 5—5 of FIG. 4, showing the vertical support lower bearing arrangement.

Referring to the detailed view, FIG. 5, each shelf bracket 113 preferably has a hub portion 121 with a vertical bore to accurately seat a roller bearing 122 carried on the lower end of the column stud 112. Above the bearing 122 is a closure plate or seal 123. Above the plate 123, there also may be provided an actuation plate 124 having a lever extension for receiving a locking pin 125 selectively engaging the clevis 159 of the piston shaft 158 of cylinder 156 (described below). On the upper face of bracket 113 are one or more vertical bores 126 so located that when the column 110 has been rotated to a desired position, for example, for the auxiliary purposes of diaphragm change or mold replacement, the pin 125 may be inserted to lock the column 110 in the desired position.

The jib arms

A jib arm 72 extends laterally of the support 71 and carries the band holder 70 from a collar or block 130 securing the upper end of stationary shaft 78. The nonextensible carriage structure of jib arm 72 includes two spaced-apart radially extending, generally triangularly shaped plates 131, the collar 130 being mounted at their apex. At their inner or base ends, the plates 131 are connected by suitable structural elements, preferably including at least four shafts 132.

Figure 9:
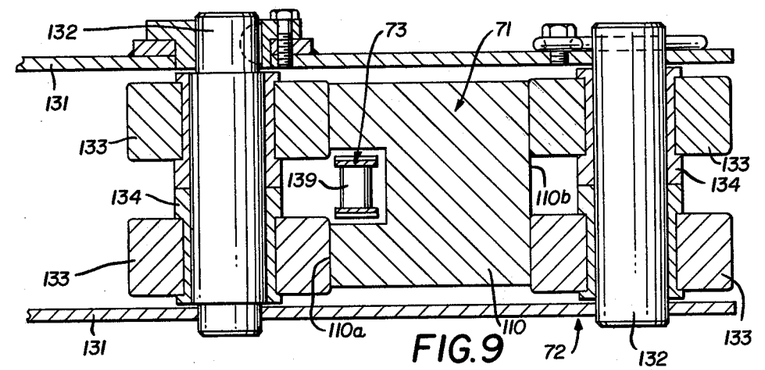
FIGS. 9 and 10 are plan sections, taken substantially as indicated on lines 9—9 and 10—10 of FIG. 7.
Figure 10:
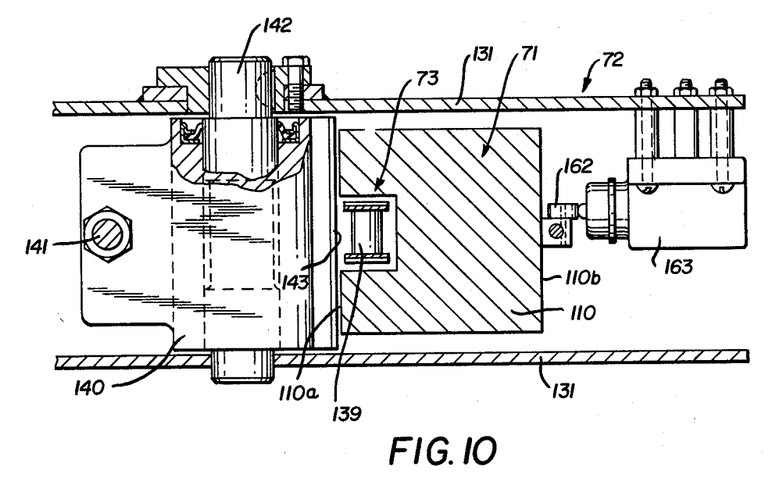
Figure 11:
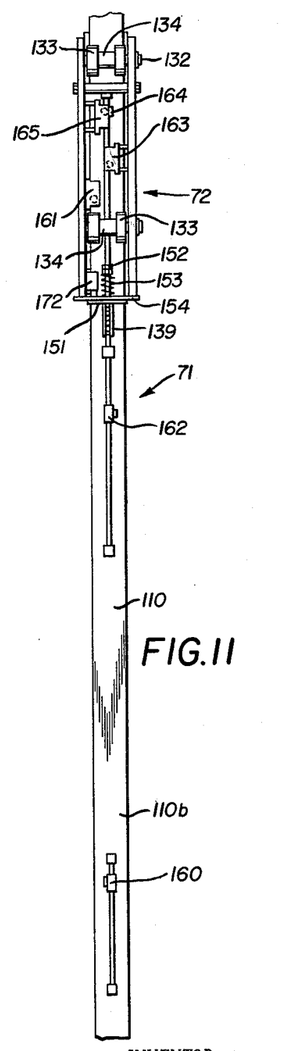
FIG. 11, taken substantially as indicated on line 11—11 of FIG. 1, is particularly intended to show the preferred location for certain of the control switches.

Each shaft 132 mounts a carriage roller 133. The rollers 133 are located as upper and lower pairs intended to engage the opposite facing parallel surfaces 110a and 110b of a support column 110. As best shown in FIG. 9, each roller 133 is preferably split, having a dual body portion spaced apart as at 134 to provide medial clearance.

Jib arm power means

The power means 73 for moving the jib arm 72 longitudinally along the support 71 includes a drive unit 135 mounted by a suitable bracket 136 on or adjacent the upper end of vertical support column 110. The drive unit 135 may include a conventional electric motor, a motor brake and a reduction gear train. As best shown in FIG. 7, the power output shaft 137 of unit 135 carries a sprocket 138. Trained over sprocket 138 is a lineal or linear power transmission means, such as roller chain 139.

Referring still to FIG. 7, the outboard downhanging end of the chain 139 is attached to the radially outer portion of a pivotally mounted carriage dog 140. To provide means for tightening the chain, the attachment to the dog 140 may be an adjustable link and cleivs 141. The dog 140 is mounted on a shaft 142 extending between the plates 131. For a safety purpose in the event chain 139 should break, the radially inner portion of dog 140 has a curved friction face 143. Beneath the dog shaft 141 is a C-shaped structural member 144 which also provides a stop for limiting rotation of the dog 140 when the jib arm is being raised. Extending between the dog 140 and member 144 is a tension spring 145 tending to bias the dog face 143 upward into engagement with the face 110a of column 110 (see the phantom lines in FIG. 7).

The inboard downhanging end of the chain 139 is trained under a sprocket 146 rotatable on a pin 147 extending transversely of a suitable slot 148 in the lower portion of a vertical column 110. After passage under the sprocket 146, the chain 139 is trained upwardly along surface 110b and is attached to the jib arm carriage.

Figure 6:
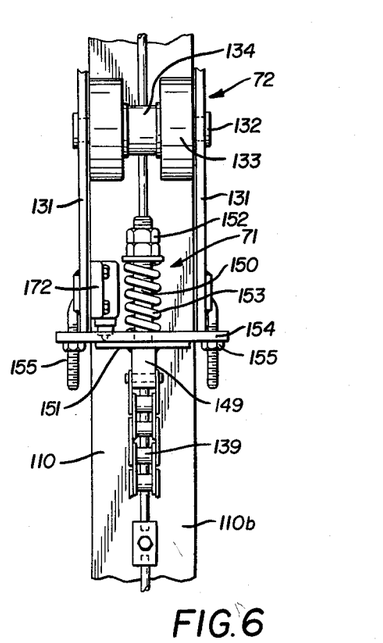
FIG. 6 is a fragmentary side elevation, taken substantially as indicated on line 6—6 of FIG. 1, showing details of the vertical support and the jib arm carriage.

As best shown in FIG. 6, the upward extending end of chain 139 terminates in a shackle 149 and a threaded extension bolt 150. Extending transversely of the shackle 149 is a shelf plate 151. Fitted coaxially around the bolt 150, above plate 151 and below a lock nut and washer assembly 152, is a compression spring 153. Extending between the lower end of spring 153 and shelf plate 151 is a hanger bracket 154 adjustably and securely attached to the jib arm plates 131 by hanger bolts and nuts 155.

Thus, both the connecting ends of the chain 139 to the jib arm carriage are resilient or tensioned and yielding. Normally, the suspended weight of the jib arm carriage will pull the radially outer end of the carriage dog 140 upwardly. In the event the chain 139 should break, as for example during use of the jib arm for the auxiliary purpose of diaphragm change or mold replacement, the tension of spring 145 will cause the dog face 143 to engage and lock against surface 110a of column 110. Normally, the chain bolt 150 is maintained by the bias of spring 153 a predetermined distance above the hanger bracket 154. In the event the chain 139 should be drawn downward in excess of either a predetermined rate or extent of movement, an electrical switch 172 (described below) will be actuated to stop the drive unit 135.

*Support power means*

The power means 74 for rotating the jib arm support 71 from the tire band B loading position to the unloading position concentric with the axis of the forming mechanism 25, and return, may be a fluid pressure operated cylinder 156. The base end of cylinder 156 may be mounted as at 157 on a lateral extension of the support column bearing closure 123. The piston shaft 158 of cylinder 156 is connected by a yoke 159 and pin 125 to the support column actuation plate 124. As shown, actuation of cylinder 156 to retract the piston shaft 158 will rotate the support 71 to a position to receive a tire band B on the floor in front of the press. Extension of the piston shaft 158 will rotate the support 71 to a position to load a tire band B in the press.

*Operation and control means*

Figure 1:
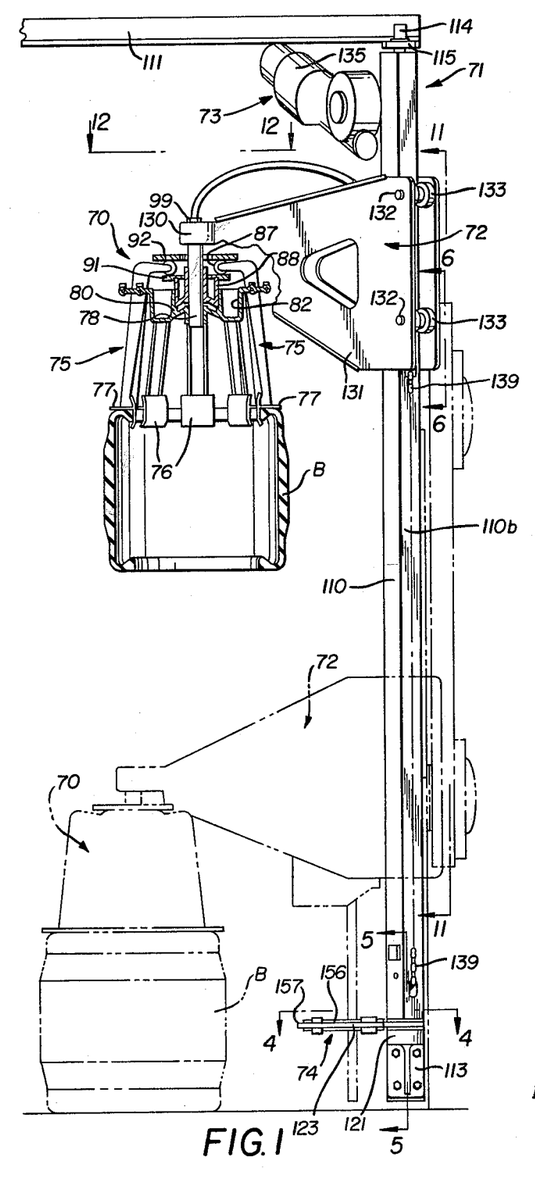
FIG. 1 is a fragmentary front elevation, largely schematic, showing the improved loading mechanism according to the invention ready to locate and position an uncured tire band in the press, the phantom lines showing the loader in position to receive a tire band on the floor in front of the press.

When a tire band B is in front of the press in position and ready for engagement and pick up by the band holder 70, a suitable control switch (not shown) is actuated. Actuation of the "ready-pickup" switch energizes power means 73 lowering the jib arm 72 longitudinally along the support 71. The jib arm 72 descends until a vertically adjustable cam 160 actuates a control switch 161 on a jib arm plate 131. Actuation of switch 161 deenergizes the power means 73. (See the phantom lines in FIG. 1.) Actuation of switch 161 also initiates a decrease of pressure in the band holder manifold 98 so that the tension means 100 will bias the operating arms 75 to the expanded or band-engaging condition. When the pressure has decreased sufficiently within manifold 98 and the tire band B has been firmly engaged, a pressure switch (not shown) communicating with the pressure fluid supply and exhaust system to the band holder 70 will reenergize power means 73 to raise the jib arm 72 longitudinally along the support 71.

The jib arm raises until a second vertically adjustable cam 162 actuates a control switch 163 on a jib arm plate 131 above switch 161. Actuation of switch 163 de-energizes the power means 73 and the jib arm 72 is stopped at a position preferably intermediate the ends of a column 110. Such an intermediate position is at least sufficiently elevated so that another tire band B may be positioned in front of the press ready for engagement and pickup.

Upon completion of the curing cycle, as controlled by the press master timer (not shown), the press opens, the tire T is stripped from the lower mold section 21, the bag 30 is elongated and the tire T is discharged or unloaded from the press. When the press is thus open and ready to receive a tire band B in registry with a mold section (the condition of FIG. 2), a suitable control switch (not shown) is actuated to re-energize power means 73 and raise the jib arm 72 to its highest elevated position. At this position (FIG. 7), a third vertically adjustable cam 164 actuates a control switch 165 on a jib arm plate 131 above switch 163.

It is preferred to control raising of the mechanism so that the bearing load of heavy tire band B, the band holder 70 and jib arm 72 is stopped at the intermediate position as controlled by switch 163. This is preferred to reduce sustained cantilevered weight loading on each vertical support column 110. However, if desired to reduce the time required for the loading operation, the press master timer could be set to energize the power means 73 and raise the jib arm 72 to the highest elevated position prior to opening of the press.

Figure 3:
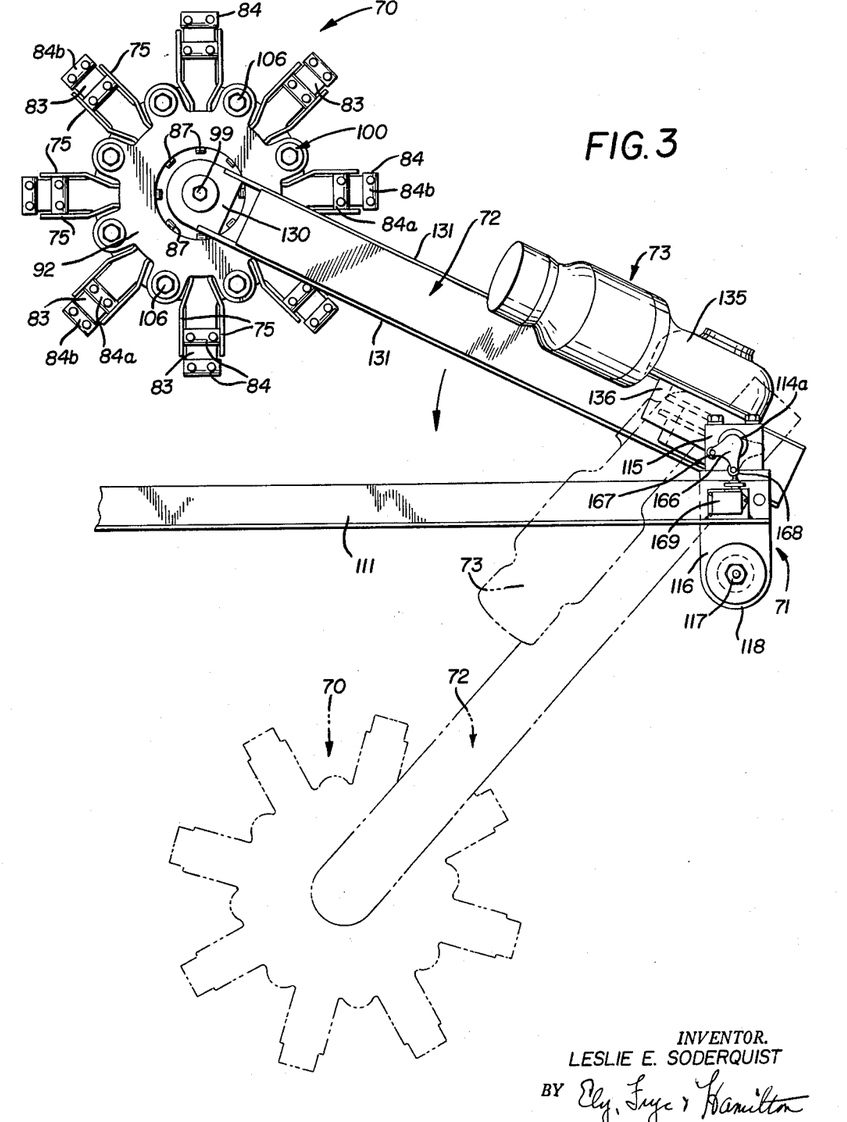
FIG. 3 is a schematic top view, showing the loading mechanism over the press, the phantom lines showing the loader in front of the press.

In any event, actuation of switch 165 de-energizes the power means 73 and the raising movement terminates. When the press is ready, suitable control means (not shown) actuates power means 74 to rotate support 71 and swing the jib arm 72 into the press (FIG. 3) so that the collar 130 carrying shaft 78 is aligned axially with a mold section.

For use with a dual-type press, two vertical support columns 110 would be located one on each front corner of a press. To conserve on the width of space required to accommodate such an installation, particularly for presses for shaping and curing large truck tires, it is preferred to locate the columns 110 in close proximity to the press. This may be accomplished if the arcs through which the two jib arms 72 rotate into the press are geometrically permitted or arranged to intersect or overlap. However, the jib arms 72 cannot then be rotated simultaneously into and out of the press.

It has been found that sequentially or successively rotating the jib arms 72 represents a satisfactory solution to the problem presented by space limitations. Referring to FIG. 8, an arm 166 may be attached to a column stud 114a. The arm 166 extends laterally and carries upper and lower cam rollers 167 and 168 for actuation of switches 169 and 170, respectively, on a bracket 171 mounted on cross beam 111.

When the leading or first moving jib arm 72a has been rotated into the press, cam roller 168 actuates switch 170. Actuation of switch 170 then actuates the power means 74b for rotating the trailing or second moving jib arm 72b into the press. The upper end 114b of the column carrying the trailing jib arm 72b would have an arm 166b, cam rollers 167b and 168b, and switches 169b and 170b, corresponding or similar to those atop the column carrying the leading jib arm 72a. When the jib arm 72b has been rotated into the press to proper position, a cam roller 168b could actuate a switch 170b.

When both jib arms 72 are in proper position with the collars 130 aligned axially with the respective mold sections, as controlled by successive actuation of switches 170a and 170b, the band holders 70 are ready for completion of the loading and positioning operation.

A band holder 70 is lowered by a power means 73 so that a tire band B engaged by the operating arms 75 passes uniformly and concentrically over an elongated bag 30. The lower bead of a tire band B first contacts the bead ring 26 of the lower mold 21 (the condition of FIG. 2), and, further, is moved downwardly to fully contact the entire bead seat area of ring 26 (the condition of FIG. 16). The pusher plates 77 extending laterally of each operating arm segment 76 provide the desired downward thrust or "push" to achieve full lower bead contact, without damage or injury to the tire band B.

Preferably, extent of downward movement is controlled by the geometric orientation of the adjustable cam 162 and switch 163. As described above, actuation of switch 163 de-energizes the power means 73. To provide a safety factor against continued downward movement of the band holder 70 after full lower bead contact, a switch 172 (referred to above) will be actuated by a downward movement of plate 151 against the resilience of spring 153 to de-energize the power means drive unit 135.

Actuation of switch 163, when switch 170 has also been actuated, further initiates the shaping of the bag 30 within the tire band B. Referring to the general description above, as the bag 30 is radially expanded during the shaping operation sequence, the upper bead ring 28-plate ring 32 assembly is lowered while maintaining the elevation of the stacking sleeve 47. During this phase of the shaping operation sequence, it is preferred to maintain the operating arm segments 75 in pressure contact with the upper bead of the tire band. The lower inner surface of each segment 75 is smoothly curved to provide a minimum of frictional resistance and to serve as a support and guide as the diaphragm bag 30 is radially expanded to shaping position within the tire band B.

When the upper end of bag 30 has moved adjacent the upper bead of the tire band B (the approximate condition of FIG. 17), the band holder 70 may be disengaged from the tire band. The introduction of pressure fluid into the band holder manifold 98 to overcome the bias of tension means 100 so that the operating arms 75 will move to the collapsed or band-disengaging condition, may be initiated by a suitable delay or interval timer switch (not shown) initially energized by actuation of switch 163. Alternatively, a pressure switch communicating with the pressure fluid supply and exhaust system to the shaping mechanism 25 might be employed to accomplish the same purpose.

In any event, when the pressure has increased sufficiently within manifold 98 and the tire band B has been disengaged, the pressure switch (described above) communicating with the fluid supply and exhaust system to the band holder 70 will re-energize the power means 73 to raise the jib arm 72 longitudinally along the support 71.

When the jib arm switch 165 is actuated by cam 164, the power means 73 is deactivated, stopping raising of the jib arm. Actuation of switch 165 also actuates power means 74 to rotate support 71 out of the press. When the switch 170 is actuated by the cam 168, the power means 74 is de-activated and the loading mechanism is in condition for actuation by the band "ready-pickup" switch, as first described above.

As has been described, it is preferred that the lower bead of a tire band B fully contact the entire bead seat area of ring 26 (the condition of FIG. 16). The downward thrust to accomplish full contact seating is transmitted from the power means 73 through the operating arm segments 75. To ensure that the necessary downward thrust is uniformly applied throughout the entire circumferential extent of the upper bead of a tire band B, it is preferred that at least a portion of each support 71 is aligned parallel to the axis of a forming mechanism 25 so that the jib arm 72 and the band holder 70 carried thereon will have moved directly downward, while the beaded edge of a tire band B carried by the holder is released on the circular bead seat area of the lower mold section. As has been described above, this result may be achieved by the precise machining of surfaces 110a and 110b of each column 110, so that as the jib arm carriage rollers 133 move longitudinally thereon, the axis of the band holder, as defined by shaft 78, will be aligned concentrically with the axis of the forming mechanism 25 and parallel to the axis of the support 71. At the very least, this condition of precise alignment should exist just before and during contact of the lower bead of a tire band B with the ring 26 of a lower mold section 21.

What is claimed is:

1. Apparatus including a tire band holder for use with a press having separable upper and lower mold sections for shaping and curing unvulcanized tire bands, said holder being operative to grip the inside surface of a tire band while said band is carried into registry with a lower mold section and loaded thereon prior to the shaping and curing operation, said apparatus further including;

a vertically extending and rotatable support permanently located at the front of the press and adjacent a lower mold section, said support having surfaces substantially parallel to the axis of said lower mold section;

said band holder being carried by a non-extensible jib arm extending radially of said support and being movably mounted thereon by a carriage adapted to engage said parallel support surfaces;

means to rotate said support to a predetermined position so that said band holder is aligned concentric with said axis of the lower mold section; and, additional means to move said carriage longitudinally along said parallel support surfaces just before and during release of said band onto said lower mold section.

2. Apparatus including a tire band holder for use with a press having separable upper and lower mold sections for shaping and curing unvulcanized tire bands, said holder being operative to grip the inside surface of a tire band while said band is carried into registry with a lower mold section and loaded thereon prior to the shaping and curing operation, said apparatus further including;

a vertically extending and rotatable support permanently located at the front of the press and adjacent a lower mold section, said support having surfaces substantially parallel to the axis of said lower mold section;

a non-extensible jib arm extending radially of said support and being movably mounted thereon by a carriage adapted to engage said parallel support surfaces;

said band holder being carried by a shaft depending from the outer end of said jib arm and comprising an upwardly facing pot cylinder on said shaft, said cylinder having an axial bore and a series of radially extending hanger brackets, a series of downwardly directed band engaging elements movably mounted on said hanger brackets, a piston in said cylinder bore surrounding said shaft, connecting linkage actuated by raising of said piston for moving said band engaging elements radially of said cylinder, and conduit means to introduce fluid pressure between said cylinder and said piston;

means to rotate said support to a predetermined position so that said band holder is aligned concentric with said axis of the lower mold section; and additional means to move said carriage longitudinally along said parallel support surfaces just before and during release of said band onto said lower mold section.

3. Apparatus including a tire band holder for use with a press having separable upper and lower mold sections for shaping and curing unvulcanized tire bands, said holder being operative to grip the inside surface of a tire band while said band is carried into registry with a lower mold section and loaded thereon prior to the shaping and curing operation, said apparatus further including;

a vertically extending and rotatable support permanently located at the front of the press and adjacent a lower mold section, said support having surfaces substantially parallel to the axis of said lower mold section;

a non-extensible jib arm extending radially of said support and being movably mounted thereon by a carriage adapted to engage said parallel support surfaces;

said band holder being carried by a shaft depending from the outer end of said jib arm and comprising an upwardly facing pot cylinder on said shaft, said cylinder having an axial bore and a series of radially extending hanger brackets, a series of downwardly directed band engaging elements movably mounted on said hanger brackets, a piston in said cylinder bore surrounding said shaft, connecting linkage actuated by raising of said piston for moving said band engaging elements radially of said cylinder, tension means normally reacting against the raising of said piston to bias said band engaging elements radially of said cylinder, and conduit means to introduce fluid pressure into said cylinder bore to overcome the bias of said tension means;

means to rotate said support to a predetermined position so that said band holder is aligned concentric with said axis of the lower mold section; and additional means to move said carriage longitudinally along said parallel support surfaces just before and during release of said band onto said lower mold section.

4. Apparatus including a tire band holder for use with a press having separable upper and lower mold sections for shaping and curing unvulcanized tire bands, said holder being operative to grip the inside surface of a tire band while said band is carried into registry with a lower mold section and loaded thereon prior to the shaping and curing operation, said apparatus further including;

a vertically extending and rotatable support permanently located at the front of the press and adjacent a lower mold section, said support having surfaces substantially parallel to the axis of said lower mold section;

a non-extensible jib arm extending radially of said support and being movably mounted thereon by a carriage adapted to engage said parallel support surfaces;

said band holder being carried by shaft depending from the outer end of said jib arm and comprising an upwardly facing pot cylinder on said shaft, said cylinder having an axial bore, an annular well surrounding said bore and a series of radially extending hanger brackets, a series of downwardly directed band engaging elements movably mounted on said hanger brackets, a piston in said cylinder bore surrounding said shaft, connecting linkage actuated by raising of said piston for moving said band engaging elements radially of said cylinder in one direction, tension means in said annular well and reacting against raising of said piston to normally bias said band engaging elements radially of said cylinder in the opposite direction, and conduit means to introduce fluid pressure into said cylinder bore to overcome the bias of said tension means;

means to rotate said support to a predetermined position so that said band holder is aligned concentric with said axis of the lower mold seciton; and additional means to move said carriage longitudinally along said parallel support surfaces just before and during release of said band onto said lower mold section.

5. Apparatus including a tire band holder for use with a press having separable upper and lower mold sections for shaping and curing unvulcanized tire bands, said holder being operative to grip the inside surface of a tire band while said band is carried into registry with a lower mold section and loaded therein prior to the shaping and curing operation, said apparatus further including;

a vertically extending and rotatable support permanently located at the front of the press and adjacent a lower mold section; said support having surfaces substanitally parallel to the axis of said lower mold section;

a non-extensible jib arm extending radially of said support and being movably mounted thereon by a carriage adapted to engage said parallel support surfaces;

said band holder being carried by a hollow stationary shaft depending from the outer end of said jib arm and having an upwardly facing pot cylinder on the lower end of said shaft, said cylinder having a large diameter bore, an annular well surrounding said bore and a series of radially extending hanger brackets, a piston slidably fitted within said cylinder bore surrounding said shaft; parallel spaced apart plates on the upper face of said piston, a series of downwardly directed operating arms movably mounted one on each said hanger bracket, the lower end of each operating arm having shoes thereon to contact said tire band, the upper end of each operating arm having actuation means movably confined between said parallel plates, tension means within said annular well normally reacting against the upper of said parallel plates to move said piston down, and conduit means to introduce fluid pressure through said hollow shaft into the bore of said cylinder to move said piston up;

means to rotate said support to a predetermined position so that said band holder is aligned concentric with said axis of the lower mold section; and additional means to move said carriage longitudinally along said parallel support surfaces just before and during release of said band onto said lower mold section.

6. Apparatus including a tire band holder for use with a press having separable upper and lower mold sections for shaping and curing unvulcanized tire bands, said holder being operative to grip the inside surface of a tire band while said band is carried into registry with a lower mold section and loaded thereon prior to the shaping and curing operation, said apparatus further including;

a vertically extending and rotatable support permanently located at the front of the press and adjacent a lower mold section, said support having surfaces substantially parallel to the axis of said lower mold section;

said band holder being carried by a non-extensible jib arm extending radially of said support and being movably mounted thereon by a carriage adapted to engage said parallel support surfaces, said carriage being moved longitudinally along said support by a lineal power transmission means (139);

means (74) to rotate said support to a predetermined position so that said band holder is aligned concentric with said axis of the lower mold section; and, power means (135) on said support connected to said linear power transmission means to move said carriage longitudinally along said parallel support surfaces just before and during release of said band onto said lower mold section, there being resilient means connecting said lineal power transmission means to said carriage, said resilient means stopping said power means if said jib arm and carriage is moved by said lineal power transmission means in excess of either a predetermined rate or extent of movement.

References Cited by the Examiner
UNITED STATES PATENTS

| | | | |
|---|---|---|---|
| 1,489,892 | 4/24 | Loughridge | 214—1.3 |
| 2,613,823 | 10/52 | Johns | 214—1.2 |
| 2,800,355 | 7/57 | Vinner et al. | 294—88 |
| 2,823,947 | 2/58 | Delzer | 294—88 |
| 2,927,343 | 3/60 | Soderquist | 18—17 XR |
| 2,956,696 | 10/60 | Drakengren | 214—1.3 XR |
| 2,997,738 | 8/61 | Soderquist | 294—93 XR |
| 3,065,503 | 11/62 | Mallory et al. | |

MICHAEL V. BRINDISI, *Primary Examiner.*

WILLIAM J. STEPHENSON, *Examiner.*

UNITED STATES PATENT OFFICE
CERTIFICATE OF CORRECTION

Patent No. 3,167,810 February 2, 1965

Leslie Edward Soderquist

It is hereby certified that error appears in the above numbered patent requiring correction and that the said Letters Patent should read as corrected below.

Column 1, line 58, for "invetinon" read -- invention --; column 5, line 17, for "specially between" read -- specially provided between --; line 59, for "rectagnular" read -- rectangular --; column 6, line 51, for "cleivs" read -- clevis --; column 11, line 24, for "by shaft" read -- by a shaft --; same column 11, line 53, for "therein" read -- thereon --.

Signed and sealed this 24th day of August 1965.

(SEAL)
Attest:

ERNEST W. SWIDER
Attesting Officer

EDWARD J. BRENNER
Commissioner of Patents